Sept. 27, 1932.  R. STAR  1,879,576
SHIP SPEED INDICATOR AND DISTANCE REGISTER
Filed Oct. 8, 1929  3 Sheets-Sheet 1
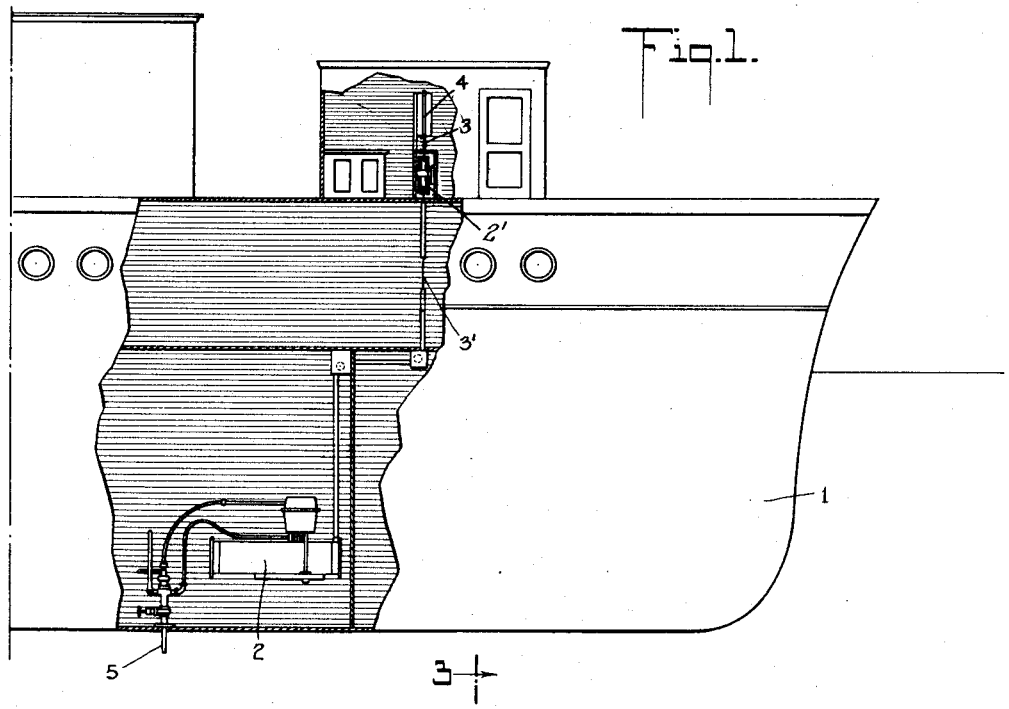
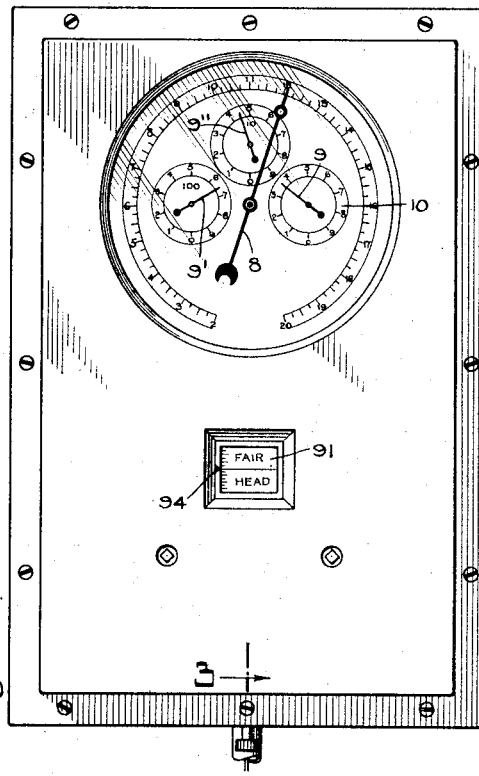
INVENTOR
Richard Star
BY
ATTORNEYS Sept. 27, 1932.  R. STAR  1,879,576
SHIP SPEED INDICATOR AND DISTANCE REGISTER
Filed Oct. 8, 1929   3 Sheets-Sheet 2
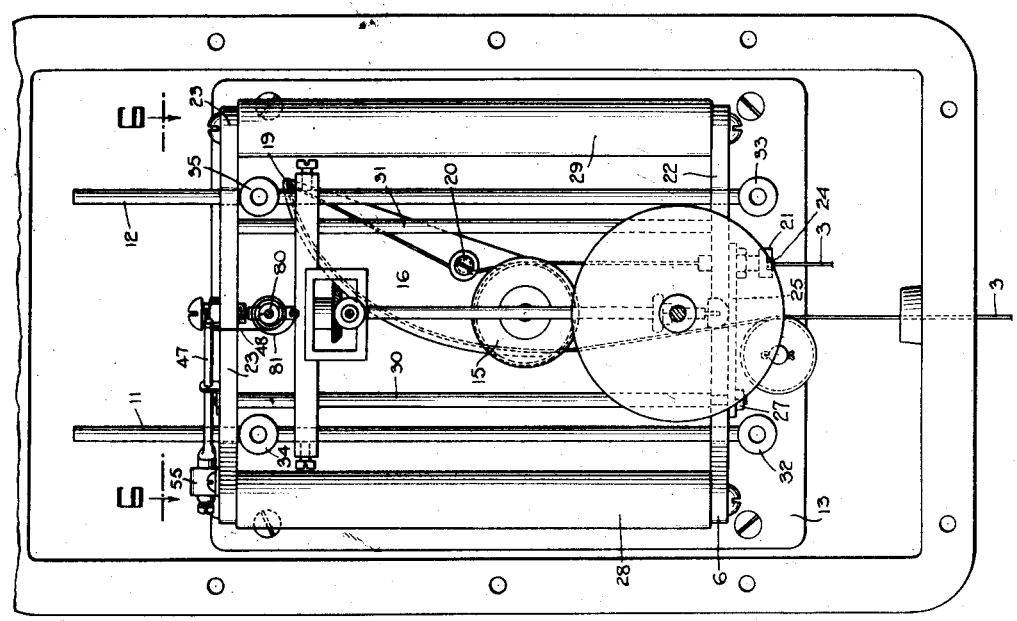
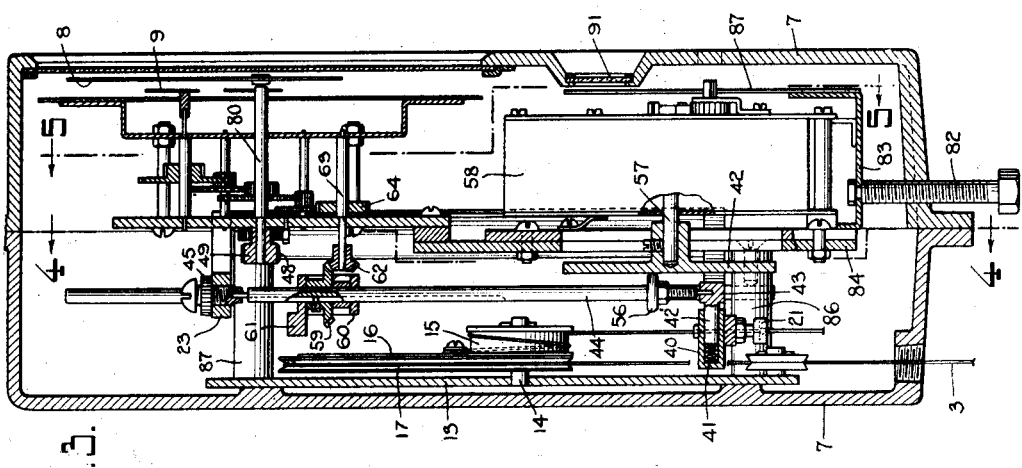
WITNESSES
INVENTOR
Richard Star
BY
ATTORNEYS Sept. 27, 1932.   R. STAR   1,879,576
SHIP SPEED INDICATOR AND DISTANCE REGISTER
Filed Oct. 8, 1929   3 Sheets-Sheet 3
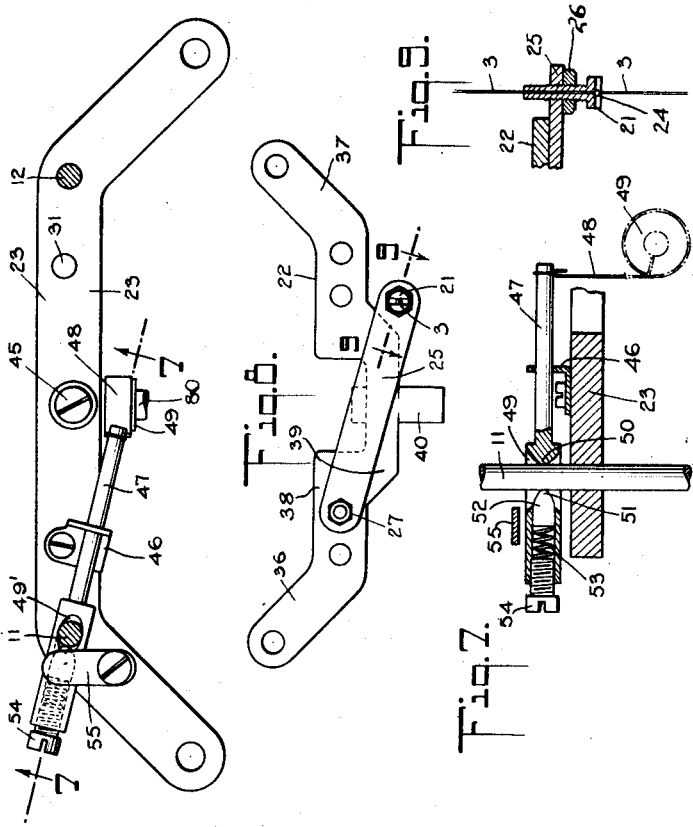
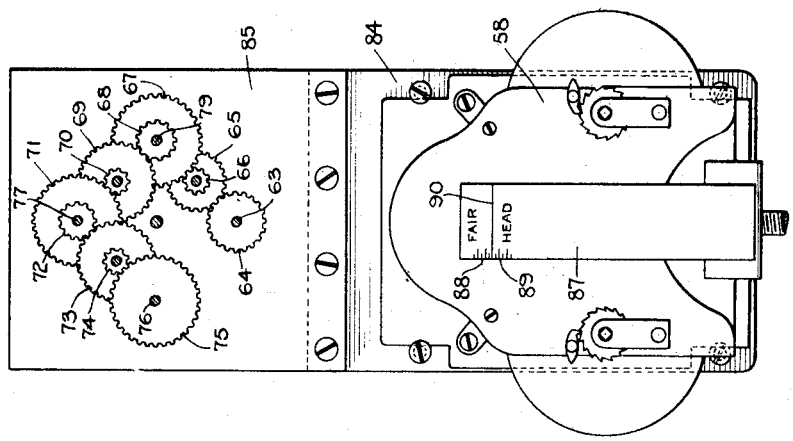
WITNESSES
INVENTOR
Richard Star
BY
ATTORNEYS Patented Sept. 27, 1932

1,879,576

UNITED STATES PATENT OFFICE

RICHARD STAR, OF BROOKLYN, NEW YORK

SHIP SPEED INDICATOR AND DISTANCE REGISTER

Application filed October 8, 1929. Serial No. 398,260.

This invention relates to speed indicators and distance registers for ships of all sizes, the object being to provide an improved construction which is sensitive and accurate, so that high speed may be accurately indicated and also small differences in speed may be indicated and registered.

Another object of the invention is to provide a device which will act as a distance register, and which when functioning will indicate the true distance in a straight line between two points rather than the distance actually traveled by the ship passing from one point to the other.

A further object, more specifically, is to provide a ship speed indicator and distance register with pointers and other parts for presenting a distance register and a pointer with associated parts for indicating speed, the various pointers and other parts being associated with means actuated by the pressure of water produced by the movement of the ship.

In the accompanying drawings,—

Figure 1 is a fragmentary view of a ship or boat with certain parts broken away and with an embodiment of the invention shown applied thereto;

Figure 2 is a front view of the speed indicator and register shown in Figure 1, the same being on an enlarged scale;

Figure 3 is a sectional view through Figure 2 approximately on the line 3—3, the same being on an enlarged scale;

Figure 4 is a sectional view through Figure 3 approximately on the line 4—4;

Figure 5 is a fragmentary sectional view through Figure 3 on the line 5—5;

Figure 6 is a fragmentary transverse sectional view through Figure 4 on the line 6—6;

Figure 7 is a sectional view through Figure 6 on the line 7—7;

Figure 8 is a bottom plan view of the bottom frame shown in Figures 3 and 4;

Figure 9 is a detail fragmentary sectional view showing the wire tension post.

As indicated in Fig. 1, the ship 1 is provided with an actuator and other parts for pulling the wire 3' in one direction according to the speed of the ship 1 for actuating the mercury balance 2' and through this device the various parts of the indicator and register 4. The actuator 2 and associated parts are fully disclosed in my prior Patents Nos. 1,603,161 and 1,641,907, and therefore, will need no special description. However, it may be stated that the actuator 2 is provided with a Pitot tube 5 which directs water upwardly into the remaining part of the device to actuate a plunger or diaphragm and through the diaphragm actuate the wire 3'. It will be noted that the wire 3' is pulled in one direction by the actuator 2 and in the opposite direction by the mercury balance 2'. As shown particularly in Figures 3 and 4, the carriage 6 is arranged in the housing or casing 7, and together with this casing and other parts, form the indicator and distance register. This device, through the pointer 8, indicates the speed at which the ship is traveling from one point to another, while the various pointers 9 with their coacting dials indicate or register the distance traveled. These pointers move continually or as long as the clock 58 is wound and the ship is moving. The pointer 8 moves as the ship increases or decreases in speed and when the ship stops the pointer moves back to zero. By looking at the device from the front, as shown in Figure 2, a person can readily see the present speed of the ship and also the distance traveled by properly reading the various dials 10 associated with the pointers 9. As the wire 3 is pulled in proportion to the pressure of water in the actuator 2, and as this pressure of water is in proportion to the speed, it is only necessary to translate the movement of wire 3 into rotary movement and to transmit this rotary movement to the pointers 8 and 9 and take care of certain error in the transmitting means in order to secure the desired result. The mechanism shown in the drawings presents one means of translating the movement of wire 3, as just mentioned. In Figs. 3 and 4 the carriage 6 is shown connected with wire 3 and is pulled upwarly so as to slide along the stationary bars 11 and 12 when wire 3 is pulled downwardy. When wire 3 is released or allowed to slacken, the weight of carriage 6 and associated parts will pull the wire 3 in the opposite direction, thus maintaining the wire substantially taut and causing the desired back and forth movement of the pointer 8 according to the speed of the ship. Arranged in the casing 7 is a base or base plate 13 which is screwed or otherwise rigidly secured to the rear of casing 7, as shown in Fig. 3. A shaft 14 is rigidly secured to base 13, and on this shaft the drum 15 is rotatably mounted. This drum is provided with extension 16 acting as a cam. This extension or cam may be integral with drum 15 or may be made separately and rigidly secured thereto. The cam 16 is provided with a groove 17 in which part of the wire 3 fits, said wire extending through an aperture 19 at the upper end and thence downwardly around the screw 20 which is screwed into a suitable aperture in cam 16 and preferably pinches the wire against cam 16 when the device is in use. From the screw 20 the wire is given one or more loops around the drum 15 and then the wire extends downwardly through an adjustable post 21. This post is carried by frame 22 which is part of the carriage 6, frame 23 being a frame similar to frame 22 but positioned at the upper end. The post 21 is hollow and the end of the wire 3 extends therethrough. An enlargement 24 is provided on wire 3 and rests against the head of the post 21, so that as said post is rotated the wire 3 may be brought under greater tension or may be released of tension, according to the direction of rotation of post 21, which post is threaded into the plate or bar 25. A lock nut 26 acts to lock post 21 against accidental rotation. Plate 25 is pivotally mounted at 27 on the frame 22 and may be swung back and forth so that the post 21 will be directly below the point where wire or cable 3 leaves the drum 15. By tightening the screw 27 the bar or plate 25 will be locked against accidental swinging movement. By forming post 21 as set forth, the position of the carriage 6 in respect to the drum 15 and cam 16 may be varied as occasion may demand to take care of any stretching of wire or cable 3 or any other similar condition.

The carriage 6 is provided with spacing posts 28 and 29 which are preferably of metal so as to add weight, whereby the carriage will be sufficiently heavy to pull wire 3 in one direction. These posts are secured by screws to the frames 22 and 23, and in addition, the rods 30 and 31 are connected to the frames 22 and 23 by being threaded therein at the ends or by solder or other suitable means. By providing these rods and posts 28 and 29 a rigid carriage is presented, and this carriage is positioned to slide up and down guided by the stationary guide rods 11 and 12. Guide rods 11 and 12 are mounted on the respective posts 32, 33, 34 and 35 carried by the base 13. As shown in Fig. 8, the frame 22 is provided with a pair of inclined end sections 36 and 37 which merge into the main body 38 which is formed with an offset portion 39 merging into a tubular extension 40. This extension is formed with a closed end, as shown in Fig. 3, whereby the spring 41 is confined and continually acts on the stud 42' to force the same outwardly or toward the disk 42 hereinafter fully described. The stud 42' is formed with a head 43 in which the lower end of the shaft 44 is journaled. The upper end of shaft 44 is journaled in an adjusting threaded post 45 which is threaded into the frame 23, as shown in Figs. 3 and 6. As shown in Fig. 6, the frame 23 is almost identical with frame 22 but is not provided with extension 40. This frame, however, is provided with a bracket 46 which holds the rod 47 which forms part of an accelerator, as hereinafter described. One end of the rod 47 has the strap 48 attached thereto. The other end of the strap 48 is attached to the drum 49 and wound thereon. It will be noted that pointer 81 is rigidly secured to shaft 80 and as the carriage 6 is moved upwardly, the band or belt 48 will rotate drum 49, and consequently, rotate or partly rotate the pointer 8 in proportion to the amount of upward movement of the carriage which is in proportion to the speed of the ship. The accelerator 47 rather loosely fits into an aperture in bracket 46 and is provided with an oval aperture 49' through which the stationary rod or post 11 extends. The accelerator 47 at aperture 49' is provided with a knife edge 50 at one end and adjacent the opposite end a point 51 of the piston or plunger 52 acts to press against the post 11. A spring 53 urges the piston 52 outwardly, and this spring is maintained under a desired tension by the screw 54. A swinging clip 55 acts to prevent one end of the accelerator 47 from moving upwardly too far. This accelerator functions when the carriage changes direction, i. e., when the carriage starts to move up it swings the end of accelerator 47 connected to strap 48 upwardly using the contact points 50 and 51 as a fulcrum and bracket 46 as a thrust member. This swinging movement of the accelerator 47 is transmitted to drum 49 through the strap 48, and a similar but reverse movement is communicated to drum 49 when the carriage starts to move downwardly. From this it will be seen that the device does not prevent acceleration but causes acceleration of the speed pointer 8 for a moment while the ship is increasing or decreasing its speed. The extent of the movement of the accelerator 47 is controlled by a clip 55. This momentary acceleration of the pointer 8 is to compensate for the lag in the action of the actuator 2 and associated parts in response to the increase or decrease of water pressure through the tube 5.

The real function of the accelerator 47 and associated parts is to take care of the steering error of the ship and the margin of lag in in the actuator 2 from increasing the speed to decreasing the speed. The pointer 8 is normally a fraction of a knot ahead of the distance register, except when the ship's speed is decreasing. Under this condition the speed pointer 8 and the distance register may synchronize. If the distance register and pointer 8 synchronize at all times then when the ship travels in still water and on as straight a course as the ship could be steered between two points, when it reaches the second point the distance register would show a greater distance than the distance between the two points given by the chart, because the ship naturally zig-zags slightly in the steering thereof, so that the actual distance travelled would be further than the distance between two points, but by reason of the structure described the straight-line distance between the two points would be indicated. The shaft 44 carries a friction wheel 56 which is rigidly clamped in place by a suitable nut, said friction wheel being held tightly against disk 42 by the spring 41 and associated parts. Disk 42 may be of any desired metal and is secured by a set screw or other means rigidly to shaft 57, which shaft is connected to the mechanism of clock 58. Shaft 57 is preferably so connected up as to have one revolution per hour, although it could be connected up to some other part of the clock to rotate faster or slower. When the wheel 56 is contacting with disk 42 centrally, said disk could be rotating but would not transmit motion to shaft 44. When the wheel 56 is in the position shown in Fig. 3 or further out toward the periphery of disk 42 motion will be transmitted thereto by disk 42, whereby shaft 44 will be rotated. It will thus be seen that shaft 44 is rotated at a speed in proportion to the speed of the disk 42 and the location of wheel 56 thereon. As the carriage 6 is raised upon the actuation of the wire or cable 3, shaft 44 will be raised, and consequently, the friction wheel 56 will be moved toward the periphery of disk 42. This upward movement of the friction wheel is in proportion to the increased speed of the ship. Consequently, the shaft 44 will rotate at a greater rate of speed because wheel 56 is engaging disk 42 nearer the periphery. A gear wheel 59 is splined on shaft 44 but is held in a fixed position by the bracket 60 which is carried by the transverse bar 61, said bar being rigidly secured to the posts 11 and 12 by suitable set screws or other securing means. The shaft 44 is adapted to move through the gear wheel 59 and as the shaft rotates power will be transmitted through gear wheel 59 to the pinion 62. This pinion is rigidly secured to shaft 63 to which the gear wheel 64 is rigidly secured. Gear wheel 64 meshes with gear wheel 65 which carries a pinion 66, and this pinion continually meshes with gear wheel 67. A pinion 68 is rigidly connected with gear wheel 67 and meshes continually with gear wheel 69 carrying pinion 70. Pinion 70 continually meshes with gear wheel 71, which latter gear wheel carries pinion 72 continually meshing with gear wheel 73. The gear wheel 73 carries a pinion 74 continually meshing with gear wheel 75. Gear wheel 75 is secured to shaft 76 which carries the pointer 9' shown in Fig. 2. Gear wheel 71 is rigidly secured to shaft 77 which carries pointer 9'' shown in Fig. 2. The gear wheel 67 is rigidly secured to shaft 79 which is rigidly secured to pointer 9. By reason of this arrangement of gearing and associated parts, the various pointers 9, 9' and 9'' move in proportion to the distance traveled and in that way register the distance traveled, as these pointers do not move in a reverse direction. As the cable 3 and associated parts raise the carriage 6, and consequently, cause the shaft 44 to move at a higher rate of speed, as just described, power is being transmitted from the accelerator 47 through the band or belt 48 to drum 49. This drum is rigidly secured to shaft 80. A spring 81 is also connected with shaft 80 so as to give the same a continuous tendency to move in a reverse direction or move the pointer 8 back to zero. When the ship's speed decreases the carriage moves downwardly and spring 81 rewinds partly the band 48 and at the same time turns the pointer 8 in a reverse direction to indicate the reduced speed. This takes place even though the pointers 9 to 9'' are still moving forwardly.

When a ship is moving in still water the structure set forth will function as described, but when the ship is moving in water which has a current, certain adjustments must be made. In case the current is flowing at the rate of one knot an hour and the current is favorable to the ship or is moving in the direction in which the ship is traveling, the adjusting screw 82 is rotated to move the plate 83 downwardly, whereby the center of the disk 42 will be moved farther from the friction wheel 56 to cause it to rotate faster. This adjustment is to be done by the captain of the ship, who must determine, in some manner, the approximate favorable current. Usually this is done by looking up the tide tables and by guessing, as an experienced captain can usually tell about the speed of the current. When the current is unfavorable or is against the ship screw 82 is rotated in the opposite direction. In this way the error in proportion to the amount of current in the locality at the time the ship passed through is taken care of and the device caused to indicate the true speed of the ship and the true distance traveled. A plate 83 carries the clock 58 and associated parts, and this plate is slidably mounted on plate 84, which is rigidly secured to the plate 85 and post 86. Post 87 acts to support plate 85, whereby these plates are held rigidly in place. Plate 85 carries the various pinions 76 to 79 inclusive and the various gear wheels associated therewith, as shown in Fig. 5. In addition, the plate 83 carries a scale 87 having graduations 88 and 89 arranged on opposite sides of a central line 90. These graduations are adapted to be seen through the glass window 91, as indicated in Figs. 2 and 3. A zero mark 94 is provided on or adjacent window 91. This indicates the amount of adjustment of screw 82, and preferably the graduations 88 and 89 are so proportioned that each graduation mark would indicate one knot. If the current is favorable screw 82 is rotated until line 90 is one graduation below the zero mark 94, but if the current is unfavorable then screw 82 would be rotated to raise the plate 83, so that the line 90 would be above the zero mark 94.

In operation after the device has been properly installed, the parts will remain stationary and all of the pointers shown in Fig. 2 will remain stationary until the ship starts to move forward. When the ship starts to move forward water will pass into the Pitot tube 5 and the actuator 2 will be actuated for pulling the cable or wire 3'. As the speed of the ship increases the pulling action will become greater and greater and the carriage 6 will be raised higher and higher. This will cause all of the pointers 9, 9' and 9" to begin to move and will cause pointer 8 to move much faster, as pointer 8 indicates the present speed of the ship. When the speed of the ship stops increasing and remains at a certain speed, as for instance, fifteen knots per hour, pointer 8 will remain stationary, but pointers 9, 9' and 9" will continue to move each in proportion to the way the same is geared. The navigator of the ship or anyone else may readily observe the speed of the ship and also the distance traveled by merely looking at the various pointers, as indicated in Fig. 2. If the ship should decrease in speed at any time this would be indicated by the movement of pointer 8 back towards zero. This reduction in speed, however, would not move the pointers 9, 9' and 9" rearwardly, but these pointers would merely slow down, according to the new speed, as these pointers do not indicate speed but the distance traveled. Ordinarily, the device will function as just set forth, and this is true on a river, sound or the ocean, but under some circumstances currents are met with in the ocean and in rivers and elsewhere. The currents are usually charted accurately so that the captain can readily learn from these charts the speed and direction of current, and if not, he must figure the current in some other way and adjust the screw 82 to take care of the error created by the current. If the captain neglects to adjust the screw 82 but leaves the parts in the position in which they would function in still water, the pointers 8 and 9 to 9" would show an error. As soon as the ship leaves the current the parts would immediately function accurately.

What I claim is:—

1. In a device for indicating the speed of ships, an indicating pointer, a reciprocating carriage, means connecting the pointer and carriage, said means translating the reciprocatory motion of the carriage into rotary motion, and an accelerator associated with said means, said accelerator functioning upon each change of direction of said carriage to accelerate the movement of said pointer, said acceleration being in a direction corresponding to the direction of movement of the carriage.

2. A speed and distance register for ships, including a plurality of pointers for indicating distance, a single pointer for indicating speed, a plurality of means including a reciprocating carriage for causing said pointers to move, a stationary rod for guiding said carriage, and an accelerator coacting with said carriage for accelerating the movement of said single pointer when the carriage changes direction, said accelerator including a substantially universally movable arm, and means including a spring for pinching said rod, said means holding one end of the arm against movement for a very short time and thereby causing an acceleration of movement of said single pointer.

3. A distance register and speed register for ships, including, a single speed pointer, means including a reciprocating carriage for moving said pointer and said distance registering means, and a band adapted to be unwound when said carriage moves in one direction and wound when the carriage moves in the opposite direction, and an accelerating arm connected to one end of said band, a bracket for loosely holding the arm in a certain position, said arm having an aperture, a stationary rod for guiding said carriage, said rod extending through said aperture and coacting with said arm, a plunger carried by said arm positioned to press against said rod, and a spring acting on the plunger for causing the plunger to continually pinch said rod, said bracket being connected with said carriage whereby when said carriage changes direction one end of the accelerator arm will in effect hesitate in following and thereby accelerate the movement of said pointer.

RICHARD STAR.